Figure 1:
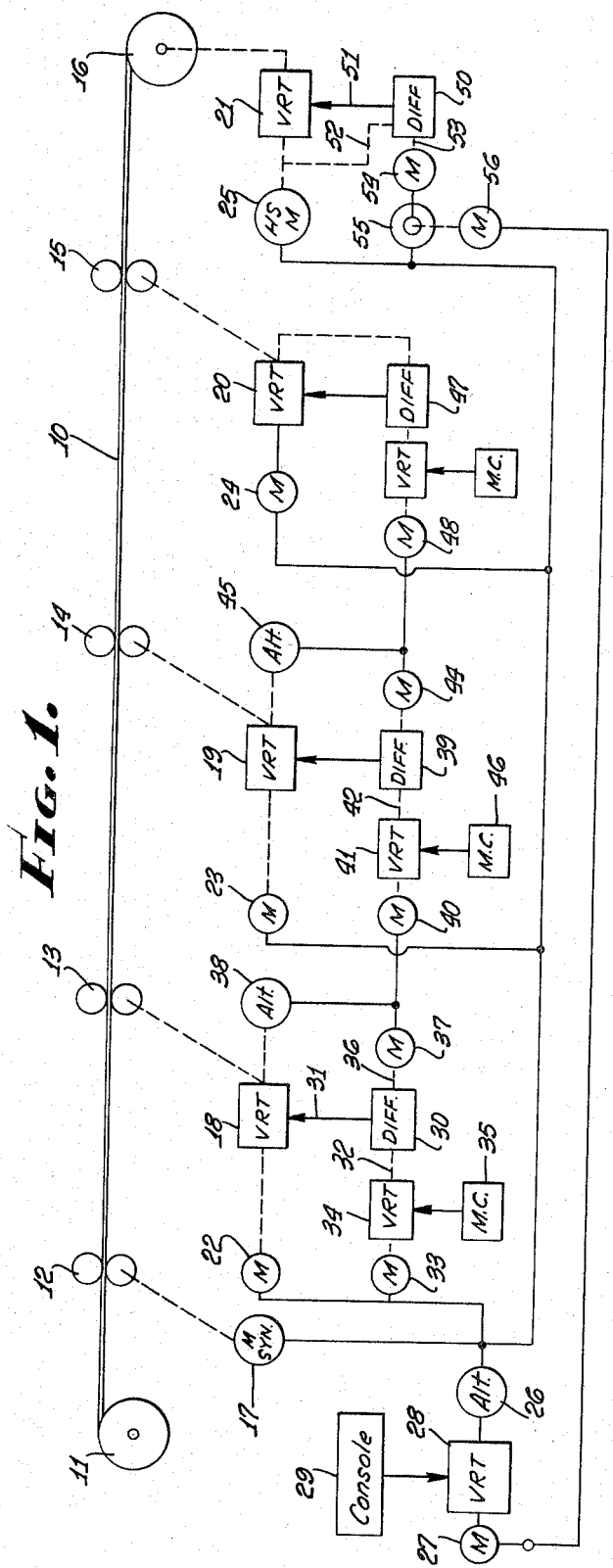

Jan. 16, 1968

R. J. CARLSON 3,364,404

PLURAL MOTOR PROCESS DRIVE

Filed Nov. 22, 1963

2 Sheets-Sheet 1

INVENTOR.
ROBERT J. CARLSON
BY
Flam and Flam
ATTORNEYS

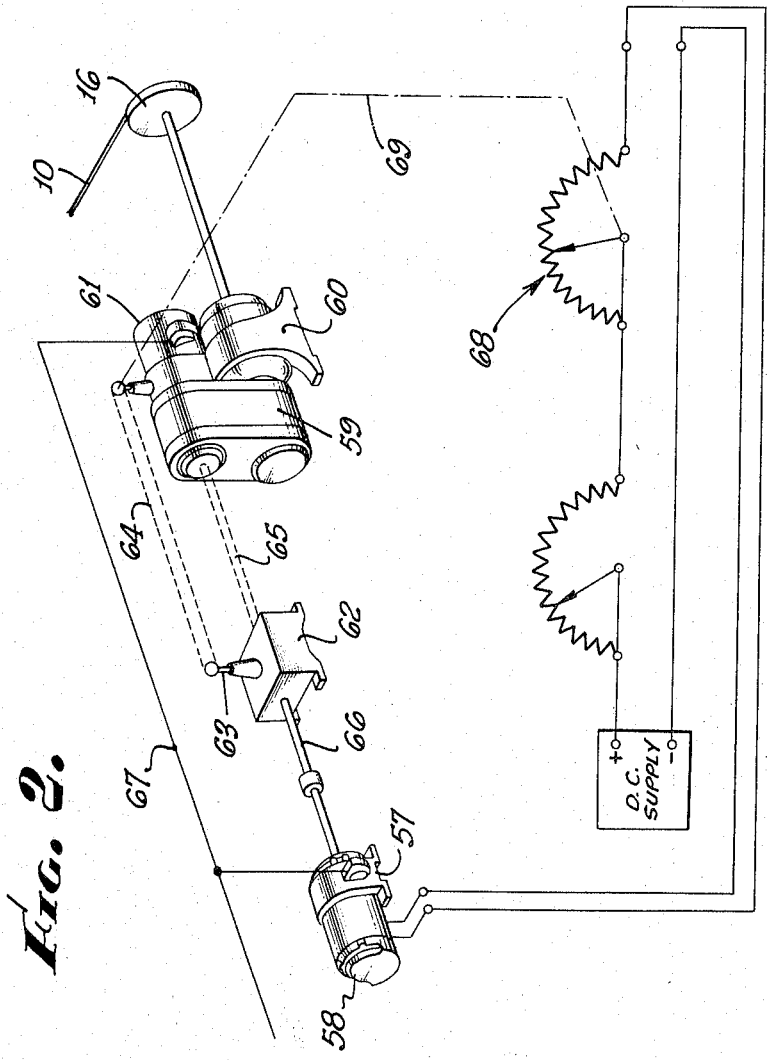

United States Patent Office 3,364,404
Patented Jan. 16, 1968

3,364,404
PLURAL MOTOR PROCESS DRIVE
Robert J. Carlson, Milford, Conn., assignor to Emerson Electric Co., a corporation of Missouri
Filed Nov. 22, 1963, Ser. No. 325,682
9 Claims. (Cl. 318—7)

This invention relates to process control systems and particularly to control systems utilizing process and windup rolls driven by transmission mechanisms having speeds variable through a continuous range.

Apparatus has heretofore been devised for controlling the speed of individual feed and windup rollers by the aid of variable speed transmissions. In order to achieve certain elongation of the processed material at each stage, it is merely necessary to set each of the variable speed transmissions. But it is often desirable during the progress of the process quickly to adjust elongation at one stage without otherwise affecting the process. Adjustment of one variable ratio transmission to change conditions at one stage would disrupt conditions at subsequent stages and further compensating adjustments would be required to keep conditions constant at subsequent stages.

One object of this invention is to provide a system for making such adjustments possible all without requiring shut down or complicated procedures.

Another object of this invention is to make it possible to incorporate in such a system a master speed control, the operation of which does not affect the draw or elongation of the material. All of the adjustments accordingly hold.

Another object of this invention is to provide a system of this character in which each set of process rollers that determine speed of the material is provided with a power unit including a variable speed transmission and a companion small control unit for adjusting the ratio of transmission and for providing an electrical signal for determining the operation of the succeeding control unit.

Another object of this invention is to provide a unique servo system for controlling the tension of a windup reel by utilizing, as the controlled variable, the speed of an induction motor driving a variable ratio transmission for the windup reel.

Still another object is to provide a servo system of this character, which, by a unique choice of a reference standard, maintains slip speed of the induction motor constant or controlled despite changes in the frequency of an alternator supplying the system.

Still another object of this invention is to provide a servo system of this character in which an adjustable constant torque device makes it possible readily to provide a reference standard for maintaining slip speed constant through a substantial frequency range.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Figure 3:
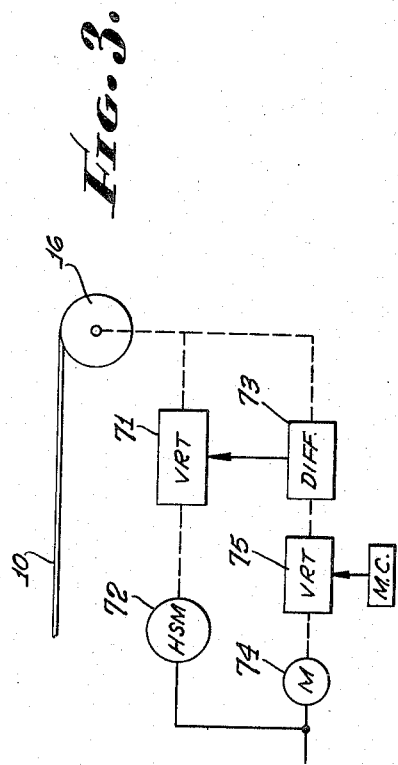

Referring to the drawings:

FIGURE 1 is a diagrammatic view of a system incorporating the present invention. Electrical connections are illustrated by dotted lines and controls are indicated by lines with arrows, the arrow pointing to the apparatus controlled; and FIGS. 2 and 3 are diagrammatic views similar to FIG. 1, but each illustrating modified forms of the present invention.

In FIG. 1 there is illustrated a tape, web or filament 10 that may be subjected to various processes. By way of example, the material 10 may be a filament subjected to spinning and related processes. The material 10 is supplied from a supply roll 11 and is moved by a number of feed rollers 12, 13, 14 and 15. In this example, four feed rollers are illustrated, but of course they may be representative of a large number. The elongation of the material between the feed rollers 12–13, 13–14 and 14–15 depends upon the speed of operation of the feed rollers 12 to 15. The windup roller 16 receives the material from the final feed roller 15.

The first feed roller 12 is operated by a synchronous motor 17 and the feed rollers 13, 14 and 15 are driven by individual variable ratio transmission mechanisms 18, 19 and 20. The windup reel 16 is driven by a similar variable ratio mechanism 21. The variable ratio transmissions may be of a type utilizing pulleys having effective diameters variable through a continuous range. The variable ratio transmission mechanisms 18, 19 and 20 are operated by induction or other suitable motors 22, 23 and 24 respectively. The motors 22, 23 and 24 and the synchronous motor 17 all derive power from a variable frequency source provided by an alternator 26.

The alternator 26 is driven at a controlled speed by a large induction motor 27 and a variable ratio transmission mechanism 28. The motor 27 is connected to power mains as indicated by terminal T. By adjusting the ratio of transmission of the mechanism 28, as by controls at a console 29, the speed of the alternator 26 is varied. Adjustment of the variable ratio transmission mechanism 28 changes the speed of operation of the process by simultaneously determining the frequency of supply to the motors 17, 22, 23, 24 and 25, and without the necessity of any feed back or servo loops.

In order to control the speed of the feed roller 13 relative to the feed roller 12, the variable ratio transmission 18 is adjusted. Adjustment is accomplished by a differential transmission 30. The differential transmission 30 provides an output in the form of a rotatable shaft capable of direct coupling to the usual adjustment shaft of the variable ratio transmission mechanism 18. The power requirements for adjustment are quite small; hence the transmission mechanism 18 is small. The shaft rotation as at 31 corresponds to an error signal representing the difference between the desired speed of the feed rollers 13 from a reference standard. However, the reference standard instead of being fixed is directly proportional to the speed of the previous feed roller 12. Accordingly, the proportionate speed relationship between the rollers 12 and 13 is maintained whatever may be the speed of the entire process as determined by the setting of the pilot variable ratio transmission mechanism 28.

This variable reference standard is derived by producing a shaft speed at one of the two inputs 32 of the differential transmission 30 by the aid of a synchronous motor 33 and a variable ratio transmission mechanism 34, both of small power rating. The setting of the variable ratio transmission mechanism 34 is accomplished manually as at a control 35. The manual control may be directly calibrated to read in relative speed of feed rollers 13 and 12. The synchronous motor 33 provides a measure of speed (in terms of shaft rotation) that corresponds to the speed of the feed roller 12 because the synchronous motor 33 and the motor 17 directly derive power from a common source 26.

The other input shaft 36 to the differential 30 is a measure of the speed of the feed rollers 13, which is the variable to be controlled by comparison with the reference standard applied at the other input shaft 32. In the present instance the rotational speed at the input 36, corresponding to the speed of the feed rollers 13, is provided by a small synchronous motor 37 that is operated from a supply provided by a small alternator 38 also coupled to the output of the variable speed transmission mechanism 18. A mechanical connection could of course be substituted between the output shaft of the variable speed transmission mechanism 18 and the synchronous motor 37 without essential change in function, but the alternator 38 is provided for reasons presently to appear.

The reference standard for control of the variable speed transmission mechanism 18 is syncronized with the feed roller 12, and hence the correct proportionate relationship between the feed rollers 12 and 13 is maintained by the servo mechanism just described.

The speed of the feed roller 14 relative to the feed roller 13 may also be adjusted in a similar manner. A differential transmission 39 corresponds to the differential transmission 30 and it serves to control the variable ratio transmission mechanism 19 that drives the feed rollers 14. A synchronous motor 40 through a variable ratio transmission mechanism 41 rotates one of the input shafts 42 to the differential transmission 39 to provide a reference standard. This reference standard is synchronized with the speed of the next preceding feed roller 13 by deriving excitation from the alternator 38 rather than from the main source at the output of the alternator 26. The other input to the differential transmission mechanism 39 corresponds to the speed of the feed rollers 14, and this is accomplished by utilizing a synchronous motor 44 that derives excitation from an alternator 45 driven by the variable ratio transmission mechanism 19. A manual control 46 adjusts the setting of the pilot variable ratio transmission mechanism 41 to determine the speed of the feed rollers 14 relative to the speed of the feed rollers 13, and it may be directly calibrated in such terms.

An adjustment of the manual control 35 for the feed rollers 13 automatically accomplishes an adjustment in the speed of the feed roller 14 to maintain the proportionality determined by the setting of the manual control 46. The reason for this is that as the speed of the feed rollers 13 is varied, the synchronous motor 40 is correspondingly varied to change the reference standard at the input shaft 42, and no adjustment need be made at control 46 to account for a change in the proportionality at any other stage of the process. Similarly, no adjustment in the manual controls 35–46 is required to maintain the requisite proportionality upon change in the speed of operation of the variable frequency source 26.

The third or final feed roller 15 is operated in a similar manner, except that in this instance an alternator is not required to provide at a remote station a signal corresponding to the speed of the feed rollers 15. Accordingly, the differential transmission mechanism 47 senses the speed of feed rollers 15 at one of its inputs by virtue of a direct mechanical connection between the output of the variable ratio transmission mechanism 20. The synchronous motor 48 derives electrical energization from the alternator 45 synchronized with the previous feed rollers 14, and the operation is similar.

The variable ratio transmission mechanism 21 adjusts the speed of the windup roller 16 in a manner so as to provide the desired tension. Accordingly, means are provided for sensing an appropriate variable for determining tension.

As the material is wound upon the windup reel 16, of course, its diameter increases. All other factors being equal, the tension of the material tends to increase. To maintain tension constant, the variable ratio transmission mechanism 21 must provide a reduced output speed. The variable ratio transmission mechanism 21 is driven by an induction motor 25 supplied from the variable frequency source 26. The induction motor 25 is designed to operate at a substantial slip, say of the order of 8 to 13 percent. This may be compared with the slip of the motors 22, 23 and 24, for example, which may operate at slips of the order of one-half of one percent. The purpose of providing such high slip will presently appear.

The power at the windup reel 16 is approximately equal to the product of the material tension and the velocity of movement of the material. If the tension is to be constant for any speed of operation, the power expended must be directly proportional to the speed of the material. The power expended in winding up the material is directly proportional to the power output of the high slip motor 25. It is known that the slip speed of an induction motor over reasonable ranges of load is directly proportional to developed torque. Hence, slip speed multiplied by induction motor speed is proportional to torque multiplied by induction motor speed. This, of course, is developed power. The power output of the motor 25 can be made directly proportional to induction motor speed by holding the slip speed of the induction motor constant. The induction motor speed is furthermore proportional to the speed of the material since the induction motor 25 is powered from the same variable frequency source as at 26 that determines, proportionately, the speed of all the feed rollers 12, 13, 14 and 15. Hence, power output can be made directly proportional to the speed of the material by holding the slip speed of the motor 25 constant.

By utilizing slip speed as a controlled variable in a servo system, it is possible to maintain windup tension constant, for example, despite changes in the speed of the material. Slip speed as such is not readily measured. But speed of motor 25 is readily measured. Motor speed 25 corresponds to system synchronous speed less slip speed. If the reference standard in a servo loop corresponds to system synchronous speed less a desired fixed slip speed, and the controlled variable is motor speed, then, of necessity, slip speed of the motor will be held constant. Such a servo system is illustrated in FIG. 1.

A differential 50 has an output shaft 51 that adjusts the transmission 21. One input shaft 52 to the differential is connected to the motor 25, the speed of which is to be controlled. The other input shaft 53 is operated by a synchronous motor 54 that is connected to the alternator 26 through a frequency changer or electrical differential 55.

The frequency changer 55 has an electrical input connected to the alternator 26 and an electrical output connected to the motor 54. The frequency changer 55 has a rotor operated at a constant or preselected speed by a synchronous motor 56 connected to the power mains as indicated by lead L. Thus the output frequency of changer 55 is system synchronous frequency less a preselected frequency, say desired slip frequency. The motor 54 operates at system synchronous speed less this preselected desired slip speed. Accordingly, by virtue of the action of the servo system, the speed of the motor 25 is system synchronous less desired slip speed. Slip speed, and hence power output to windup reel 16, is then constant.

The high slip of the motor 25 ensures adequate sensitivity for the servo system.

The selected slip speed and hence the desired material tension need not be constant. Thus, various known systems "taper" the tension, that is, cause its reduction as a function of reel diameter. This ensures suitable stability of the material on the reel.

In order to taper tension in the present system, it is merely necessary to interpose some variable ratio device to influence one of the input shafts 52 or 53 and then control the ratio as a function of windup reel motion. For example, a variable ratio transmission may be interposed between the motor 25 and the differential 50, with its control shaft connected through gearing to the shaft of the windup reel 16.

Optionally, the speed of the motor 56 could be changed by various electrical or mechanical devices.

In the form of the invention shown in FIG. 2, a simplified system is illustrated for producing the reference standard. In place of the motors 54 and 56 and the frequency changer 55, there is provided an induction motor 57 and an adjustable torque device 58. A variable ratio transmission mechanism 59 corresponding to the device 21 is mounted upon a gear drive 60 for operating the windup reel 16. The variable ratio transmission mechanism 59 is operated by a high slip motor 61 corresponding to the high slip motor 25. A mechanical differential 62 corresponds to the differential 50.

As in connection with FIG. 1, the differential 62 has an output shaft 63 that adjusts the transmission 59 as by the aid of a chain belt 64. One input shaft 65 to the differential 62 is connected to the shaft of the main drive motor 61 as in the previous form. The other input shaft 66 to the mechanical differential 62 is directly connected to the pilot motor 57. The pilot motor 57 is an induction motor capable of attaining slip speeds conveniently commensurate with the slip speeds of the induction motor 61. Both motors 57 and 61 derive energization from the variable frequency supply line 67.

The torque device or brake 58 for example may be an eddy current device, having a direct current field coil. The intensity of energization of such field coil determines the torque drag on the pilot motor 57, and hence its slip speed whatever the frequency of the supply line 67 may be. By adjusting the torque brake 58 to a particular desired value, the slip speed of the pilot motor 57 is determined, and by virtue of the servo system, the slip speed of the main drive motor 61 is correspondingly determined.

In order to taper tension, a compensating potentiometer 68 may be inserted in the excitation circuit for the torque brake 58. The potentiometer 68 is operated by a linkage 69 that senses the belt ratio setting of the variable ratio transmission mechanism 59. As the belt ratio is changed to reduce output speed (corresponding to an increase of reel diameter) more resistance is inserted into the excitation circuit effectively to change the set point of the servo device 62. Thus the slip speed of the reference motor 57 is reduced as a function of the reel diameter, and the tension in the windup reel is correspondingly diminished.

In the form of the invention illustrated in FIG. 3, a simpler, but less automatic, system is illustrated for the windup section. A variable ratio transmission 71 is driven by a high slip motor 72 from the system line. A mechanical differential 73 serves to adjust the ratio of the transmission 71. In the present instance the speed of motor 72 is again the controlled variable, the motor shaft driving one input to the differential 73. The reference standard is, in this instance, a fixed fraction of synchronous speed. This is achieved by a synchronous motor 74 deriving excitation from the system line, and a variable or fixed ratio transmission 75 driven by the motor 74 and in turn driving the other input to the differential 73.

The speed of high slip motor 72 is thus held to a constant ratio of synchronous speed. This means that the slip speed is not constant, but directly proportional to frequency of system line. If that frequency is constant, then the power of motor 72 is constant, and the windup tension likewise is constant.

If the system frequency changes, then the transmission 75 must have a variable ratio whereby that ratio can be adjusted manually or otherwise in order to keep slip speed, and hence windup tension, constant.

The inventor claims:

1. In a speed control system for process of material: a series of process rollers for determining the speed of the material in process at successive stages; a series of power units for operating the process rollers at intermediate stages, and each including a variable ratio transmission having an output shaft connected to its process roller and having a member movable to adjust the ratio of transmission, a main motor for operating the variable ratio transmission, and a mechanical differential having an output shaft for providing an error signal and connected to said movable member whereby the ratio of transmission is adjusted in a direction to reduce said error signal, said differential having a first input shaft driven in proportion to the speed of the corresponding process roller to provide a signal to be controlled, said differential having a second input shaft, a supplemental motor for operating said second input shaft, means operatively associated with the preceding process roller for generating electrical energy for said supplemental motor to drive said supplemental motor at a speed proportional to the speed of the preceding process roller whereby the said error signal corresponds to the difference between the speed of said main motor and a proportion of the speed of the preceding process roller, and means for adjusting the proportionate effect of the speed of said preceding process roller on said second input shaft relative to the proportionate effect of the speed of said process roller of the corresponding stage on said first input shaft whereby the speed of said process roller is maintained at a set proportion of the speed of the preceding process roller independently of the speed of said preceding process roller.

2. The combination as set forth in claim 1 in which said adjusting means comprises a variable ratio transmission interposed between one of said input shafts and its corresponding motive source.

3. The combination as set forth in claim 1 in which said main motors for operating said variable ratio transmissions are speed responsive to source frequency; and means providing a common adjustable frequency source for said main motors.

4. The combination as set forth in claim 1 in which each stage includes an alternator synchronously associated with the corresponding process rollers; said electrical energy generating means comprising the alternator of the preceding stage; each stage further including a synchronous motor energized by the alternator of the corresponding stage for driving the first input shaft of the corresponding mechanical differential.

5. The combination as set forth in claim 4 in which said main motors for operating said variable ratio transmissions are speed responsive to the frequency of said source, and in which said common source means is adjustable to vary the source frequency.

6. In a speed control system for process of material: a series of process rollers for determining the speed of the material in process at successive stages; a series of power units for operating the process rollers at intermediate stages, and each including a variable ratio transmission having an output shaft connected to its process roller and having a member movable to adjust the ratio of transmission, a main motor for operating the variable ratio transmission, and a mechanical differential having an output shaft for providing an error signal and connected to said movable member whereby the ratio of transmission is adjusted in a direction to reduce said error signal, said differential having a first input shaft driven in proportion to the speed of the corresponding process roller to provide a signal to be controlled, said differential having a second input shaft, a supplemental motor for operating said second input shaft, means operatively associated with the preceding process roller for generating electrical energy for said supplemental motor to drive said supplemental motor at a speed proportional to the speed of the preceding process roller whereby the said error signal corresponds to the difference between the speed of said main motor and a proportion of the speed of the preceding process roller, and means for adjusting the proportionate effect of the speed of said preceding process roller on said second input shaft relative to the proportionate effect of the speed of said process roller of the corresponding stage on said first input shaft whereby the speed of said process roller is maintained at a set proportion of the speed of the preceding process roller independently of the speed of said preceding process roller; a windup reel; a variable ratio transmission for operating the windup reel; an induction motor for operating the variable ratio transmission for the windup reel; a common alternating current source of energy for the induction motor and the motors for the other variable ratio transmissions; a servo system for adjusting the ratio of the variable ratio transmission for the windup reel, in which the speed of the induction motor is directly controlled to maintain a constant slip speed of said induction motor.

7. The combination as set forth in claim 6 in which said common alternating current source has a controllable frequency characteristic to vary proportionately the speed of the induction motor and the motors operating the variable ratio transmissions for the intermediate process rollers.

8. The combination as set forth in claim 7 in which the speed of the induction motor is the directly controlled variable in said servo system and in which the reference standard is provided by the output of a synchronous motor operated from said source through a frequency changer, said frequency changer having an input connected to said source, an output connected to said synchronous motor, and a rotor operated at a selected speed corresponding to a desired slip speed whereby slip speed is held constant by the servo system independently of system frequency.

9. In a speed control system for process material: a windup reel; a variable ratio transmission for operating said windup reel; an induction motor for operating said transmission; variable frequency means for supplying alternating current energy to said induction motor; said variable ratio transmission having a member movable to adjust the ratio of said transmission; a mechanical servo mechanism having a first input shaft for a reference standard, a second input shaft operatively associated with the motor for movement at a speed directly proportional to the speed of said motor for comparison to the reference standard, said mechanism having an output shaft connected to said movable member; and means for operating said first input shaft including a synchronous motor operated from said supplying means, and a selected differential frequency changer interposed between said supplying means and said synchronous motor whereby said first input shaft is operated at a speed corresponding to system synchronous speed less a slip speed corresponding to the setting of said differential frequency changer whereby slip speed of said induction motor is held to a value corresponding to the setting of said differential frequency changer by the servo mechanism in which speed of the induction motor is the directly controlled variable.

References Cited
UNITED STATES PATENTS

| | | | |
|---|---|---|---|
| 2,994,787 | 8/1961 | Fraser | 318—8 X |
| 3,035,193 | 5/1962 | Ethier | 318—6 X |
| 1,837,803 | 12/1931 | Weston | 318—8 X |
| 2,392,226 | 1/1946 | Butterworth et al. | 318—8 X |
| 3,179,863 | 4/1965 | Corey | 318—6 |

ORIS L. RADER, *Primary Examiner.*

T. LYNCH, *Assistant Examiner.*